US012671490B2

(12) United States Patent
Veijalainen et al.

(10) Patent No.: US 12,671,490 B2
(45) Date of Patent: Jun. 30, 2026

(54) METHOD, APPARATUS AND COMPUTER PROGRAM

(71) Applicant: NOKIA TECHNOLOGIES OY, Espoo (FI)

(72) Inventors: Teemu Mikael Veijalainen, Helsinki (FI); Kalle Petteri Kela, Kaarina (FI); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 397 days.

(21) Appl. No.: 18/224,306

(22) Filed: Jul. 20, 2023

(65) Prior Publication Data

US 2024/0048219 A1 Feb. 8, 2024

(30) Foreign Application Priority Data

Aug. 5, 2022 (FI) ..................................... 20225700

(51) Int. Cl.
*H04B 7/08* (2006.01)
*H04B 7/06* (2006.01)

(52) U.S. Cl.
CPC ........... *H04B 7/088* (2013.01); *H04B 7/0626* (2013.01)

(58) Field of Classification Search
CPC .. H04B 7/088; H04B 7/0626; H04B 7/06964; H04W 28/095
See application file for complete search history.

(56) References Cited

U.S. PATENT DOCUMENTS

2020/0358514 A1* 11/2020 Landis ............... H04B 17/3913
2020/0404639 A1 12/2020 Zhou et al.

2021/0051495 A1* 2/2021 Gupta ................... H04W 24/04
2021/0410220 A1 12/2021 Liu et al.
2022/0078848 A1* 3/2022 Hu ......................... H04L 5/0048
2022/0224396 A1 7/2022 Wong et al.
2025/0088880 A1* 3/2025 Liu ......................... G06F 30/27

FOREIGN PATENT DOCUMENTS

WO 2018171044 A1 9/2018
WO WO-2023286884 A1 * 1/2023 ........... H04B 7/0456

OTHER PUBLICATIONS

Office Action and Search Report dated Dec. 7, 2022 corresponding to Finnish Patent Application No. 20225700.
Nokia et al., "Evaluation on ML for beam management," 3GPP Draft; R1-2204573, 3GPP TSG RAN WG1 #109, e-Meeting, May 9-May 20, 2022.
Extended European Search Report dated Jan. 2, 2024, corresponding to European Patent Application No. 23188892.6.

* cited by examiner

*Primary Examiner* — Gary Mu

*Assistant Examiner* — Nancy Sixto

(74) *Attorney, Agent, or Firm* — Carter, DeLuca & Farrell LLP

(57) ABSTRACT

There is provided an apparatus comprising at least one processor and at least one memory storing instructions. When the instructions are executed by the at least one processor, the apparatus is caused to perform determining a first beam and a second beam for receiving at least one data packet from an access node of a network. The apparatus is further caused to perform receiving, from the access node, a re-transmission of the at least one data packet using the second beam when reception of the at least one data packet from the access node has failed using the first beam.

1 Claim, 8 Drawing Sheets

402

Beam usage for *i*th beam is derived from scheduling counts: $count_i/count_{max}$ Hidden layers Neural network input for n gNB beams. (Inputs for beams without usage or RSRP values are zeros.)

Q value output for *n* gNB beams          404

400

User reported RSRPs e.g. for 1-4 best beams. Value range [-140, -44] dBm scaled to [-1,1]

500 determining a first beam and a second beam for receiving at least one data packet from an access node of a network 502 receiving, from the access node, a re-transmission of the at least one data packet using the second beam when reception of the at least one data packet from the access node has failed using the first beam 504 attempting transmission at least one data packet to a user equipment using a first beam 506 determining that the transmission of the at least one data packet to the user equipment using the first beam has failed 508 sending, to a user equipment, a re-transmission of at least one data packet using a second beam in response to determining that the transmission of the at least one data packet to the user equipment using the first beam has failed

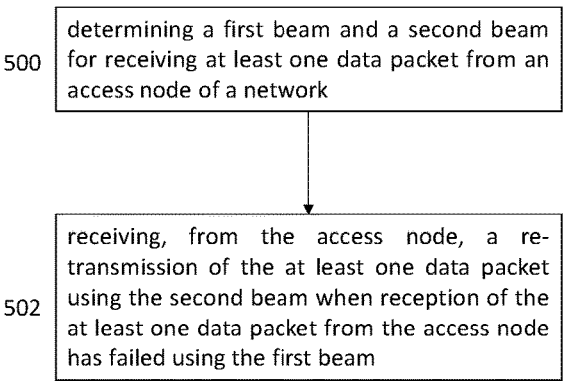
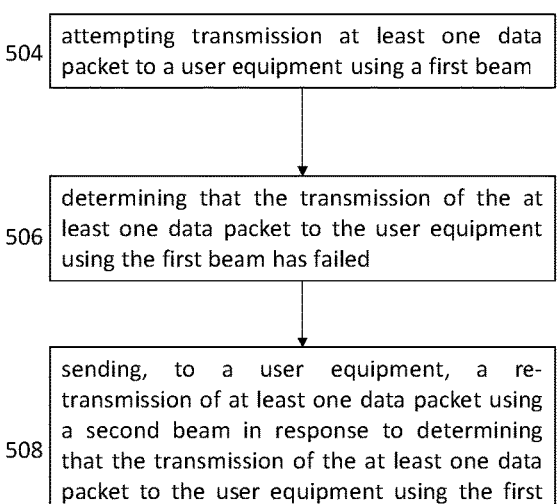

Fig. 5

METHOD, APPARATUS AND COMPUTER PROGRAM

CROSS REFERENCE TO RELATED APPLICATION

This application claims the benefit of Finnish Patent Application No. 20225700, filed Aug. 5, 2022. The entire content of the above-referenced application is hereby incorporated by reference.

FIELD

The present application relates to a method, apparatus, system and computer program and in particular but not exclusively to performing data packet retransmission on a second beam when transmission on a first beam has failed.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UNITS) radio-access technology and so-called 5G or New Radio (NR) networks. NR is being standardized by the 3rd Generation Partnership Project (3GPP).

SUMMARY

According to an aspect, there is provided an apparatus comprising: means for determining a first beam and a second beam for receiving at least one data packet from an access node of a network; and means for receiving, from the access node, a re-transmission of the at least one data packet using the second beam when reception of the at least one data packet from the access node has failed using the first beam.

The means for determining the first beam and the second beam may comprise means for: receiving, from the access node, information identifying the first beam and information identifying the second beam.

The apparatus may comprise means for: sending, to the access node, one or more channel state information measurements, wherein at least the information identifying the first beam is based on the one or more channel state information measurements.

The means for determining the first beam and the second beam may comprise: means for receiving, from the access node, information identifying the first beam; and means for determining the second beam based on one or more channel state information measurements.

The means for determining the first beam and the second beam may comprise: means for obtaining one or more channel state information measurements; and means for determining the first beam and the second beam based on the obtained one or more channel state information measurements.

The apparatus may further comprise: means for receiving, from the access node, beam usage information, wherein the means for determining the first beam and the second beam comprises means for determining the first beam based on the obtained one or more channel state information measurements and the beam usage information.

The means may be for sending, to the access node, information identifying the first beam and information identifying the second beam.

The means for determining the first beam and the second beam based on the obtained one or more channel state information measurements may comprise means for: determining a plurality of candidate second beams based on the obtained one or more channel state information measurements; sending, to the access node, a list comprising the determined plurality of candidate second beams; and receiving, from the access node, information identifying the second beam selected from the list comprising the determined plurality of candidate second beams.

The means for determining the first beam and the second beam may comprise means for utilizing a machine learning model to determine at least the first beam.

The apparatus may comprise means for: performing model re-training of the machine learning model in response to receiving the re-transmission of the at least one data packet using the second beam.

The means for determining the second beam may comprise means for: sending, to the access node, a list comprising a plurality of candidate second beams; and receiving, from the access node, information identifying second beam selected from the list comprising the plurality of candidate second beams.

According to an aspect, there is provided an apparatus comprising: means for attempting transmission at least one data packet to a user equipment using a first beam; means for determining that the transmission of the at least one data packet to the user equipment using the first beam has failed; and means for sending, to a user equipment, a re-transmission of at least one data packet using a second beam in response to determining that the transmission of the at least one data packet to the user equipment using the first beam has failed.

The apparatus may further comprise: means for determining the first beam; and means for sending, to the user equipment, information identifying the first beam.

The apparatus may further comprise means for determining the second beam.

The means for determining the second beam may comprise means for: receiving, from the user equipment, a list comprising a plurality of candidate second beams; selecting the second beam from the list comprising the plurality of candidate second beams; and sending, to the user equipment, information identifying the selected second beam.

The means for sending the information identifying the first beam may comprise means for sending, to the user equipment, information identifying the first beam and information identifying the second beam.

The apparatus may further comprise: means for receiving, from the user equipment, one or more channel state information measurements, wherein the means for determining the first beam comprises means for determining at least the first beam based on the obtained one or more channel state information measurements.

The means for determining the second beam may comprise means for determining the second beam based on the one or more channel state information measurements.

The means for determining the first beam may comprise means for determining the first beam based on the one or more channel state information measurements and beam usage information.

The means for determining the first beam may comprise means for utilizing a machine learning model to determine at least the first beam.

The apparatus may further comprise means for: performing re-training of the machine learning model in response to sending the re-transmission of the at least one data packet using the second beam.

The apparatus may further comprise: means for receiving, from the user equipment, information identifying the first beam and information identifying the second beam.

According to an aspect, there is provided an apparatus comprising at least one processor and at least one memory storing instructions that, when executed by the at least one processor, cause the apparatus at least to: determine a first beam and a second beam for receiving at least one data packet from an access node of a network; and receive, from the access node, a re-transmission of the at least one data packet using the second beam when reception of the at least one data packet from the access node has failed using the first beam.

The at least one processor may be configured to cause the apparatus to: receive, from the access node, information identifying the first beam and information identifying the second beam.

The at least one processor may be configured to cause the apparatus to: send, to the access node, one or more channel state information measurements, wherein at least the information identifying the first beam is based on the one or more channel state information measurements.

The at least one processor may be configured to cause the apparatus to: receive, from the access node, information identifying the first beam; and determine the second beam based on one or more channel state information measurements.

The at least one processor may be configured to cause the apparatus to: obtain one or more channel state information measurements; and determine the first beam and the second beam based on the obtained one or more channel state information measurements.

The at least one processor may be configured to cause the apparatus to: receive, from the access node, beam usage information, wherein the at least one processor may be configured to cause the apparatus to determine the first beam based on the obtained one or more channel state information measurements and the beam usage information.

The at least one processor may be configured to cause the apparatus to send, to the access node, information identifying the first beam and information identifying the second beam.

The at least one processor may be configured to cause the apparatus to: determine a plurality of candidate second beams based on the obtained one or more channel state information measurements; send, to the access node, a list comprising the determined plurality of candidate second beams; and receive, from the access node, information identifying the second beam selected from the list comprising the determined plurality of candidate second beams.

The at least one processor may be configured to cause the apparatus to utilize a machine learning model to determine at least the first beam.

The at least one processor may be configured to cause the apparatus to perform model re-training of the machine learning model in response to receiving the re-transmission of the at least one data packet using the second beam.

The at least one processor may be configured to cause the apparatus to send, to the access node, a list comprising a plurality of candidate second beams; and receiving, from the access node, information identifying second beam selected from the list comprising the plurality of candidate second beams.

According to an aspect, there is provided an apparatus comprising at least one processor and at least one memory storing instructions that, when executed by the at least one processor, cause the apparatus at least to: attempt transmission at least one data packet to a user equipment using a first beam; determine that the transmission of the at least one data packet to the user equipment using the first beam has failed; and send, to a user equipment, a re-transmission of at least one data packet using a second beam in response to determining that the transmission of the at least one data packet to the user equipment using the first beam has failed.

The at least one processor may be configured to cause the apparatus to determine the first beam; and send, to the user equipment, information identifying the first beam.

The at least one processor may be configured to cause the apparatus to determine the second beam.

The at least one processor may be configured to cause the apparatus to: receive, from the user equipment, a list comprising a plurality of candidate second beams; select the second beam from the list comprising the plurality of candidate second beams; and send, to the user equipment, information identifying the selected second beam.

The at least one processor may be configured to cause the apparatus to send, to the user equipment, information identifying the first beam and information identifying the second beam.

The at least one processor may be configured to cause the apparatus to: receive, from the user equipment, one or more channel state information measurements, wherein the at least one processor may be configured to cause the apparatus to determine at least the first beam based on the obtained one or more channel state information measurements.

The at least one processor may be configured to cause the apparatus to determine the second beam based on the one or more channel state information measurements.

The at least one processor may be configured to cause the apparatus to determine the first beam based on the one or more channel state information measurements and beam usage information.

The at least one processor may be configured to cause the apparatus to utilize a machine learning model to determine at least the first beam.

The at least one processor may be configured to cause the apparatus to perform re-training of the machine learning model in response to sending the re-transmission of the at least one data packet using the second beam.

The at least one processor may be configured to cause the apparatus to receive, from the user equipment, information identifying the first beam and information identifying the second beam According to an aspect, there is provided a method comprising: determining a first beam and a second beam for receiving at least one data packet from an access node of a network; and receiving, from the access node, a re-transmission of the at least one data packet using the second beam when reception of the at least one data packet from the access node has failed using the first beam.

Determining the first beam and the second beam may comprise: receiving, from the access node, information identifying the first beam and information identifying the second beam.

The method may comprise: sending, to the access node, one or more channel state information measurements, wherein at least the information identifying the first beam is based on the one or more channel state information measurements.

Determining the first beam and the second beam may comprise: receiving, from the access node, information identifying the first beam; and determining the second beam based on one or more channel state information measurements.

Determining the first beam and the second beam may comprise: obtaining one or more channel state information measurements; and determining the first beam and the second beam based on the obtained one or more channel state information measurements.

The method may comprise: receiving, from the access node, beam usage information, wherein determining the first beam and the second beam comprises determining the first beam based on the obtained one or more channel state information measurements and the beam usage information.

The method may comprise sending, to the access node, information identifying the first beam and information identifying the second beam.

Determining the first beam and the second beam based on the obtained one or more channel state information measurements may comprise: determining a plurality of candidate second beams based on the obtained one or more channel state information measurements; sending, to the access node, a list comprising the determined plurality of candidate second beams; and receiving, from the access node, information identifying the second beam selected from the list comprising the determined plurality of candidate second beams.

Determining the first beam and the second beam may comprise utilizing a machine learning model to determine at least the first beam.

The method may comprise: performing model re-training of the machine learning model in response to receiving the re-transmission of the at least one data packet using the second beam.

Determining the second beam may comprise: sending, to the access node, a list comprising a plurality of candidate second beams; and receiving, from the access node, information identifying second beam selected from the list comprising the plurality of candidate second beams.

According to an aspect, there is provided a method comprising: attempting transmission at least one data packet to a user equipment using a first beam; determining that the transmission of the at least one data packet to the user equipment using the first beam has failed; and sending, to a user equipment, a re-transmission of at least one data packet using a second beam in response to determining that the transmission of the at least one data packet to the user equipment using the first beam has failed.

The method may comprise: determining the first beam; and sending, to the user equipment, information identifying the first beam.

The method may comprise determining the second beam.

Determining the second beam may comprise: receiving, from the user equipment, a list comprising a plurality of candidate second beams; selecting the second beam from the list comprising the plurality of candidate second beams; and sending, to the user equipment, information identifying the selected second beam.

Sending the information identifying the first beam may comprise sending, to the user equipment, information identifying the first beam and information identifying the second beam.

The method may comprise: receiving, from the user equipment, one or more channel state information measurements, wherein determining the first beam comprises determining at least the first beam based on the obtained one or more channel state information measurements.

Determining the second beam may comprise determining the second beam based on the one or more channel state information measurements.

Determining the first beam may comprise determining the first beam based on the one or more channel state information measurements and beam usage information.

Determining the first beam may comprise utilizing a machine learning model to determine at least the first beam.

The method may comprise: performing re-training of the machine learning model in response to sending the re-transmission of the at least one data packet using the second beam.

The method may comprise: receiving, from the user equipment, information identifying the first beam and information identifying the second beam.

According to an aspect, there is provided a computer readable medium comprising instructions which, when executed by an apparatus, cause the apparatus to perform at least the following: determining a first beam and a second beam for receiving at least one data packet from an access node of a network; and receiving, from the access node, a re-transmission of the at least one data packet using the second beam when reception of the at least one data packet from the access node has failed using the first beam.

Determining the first beam and the second beam may comprise: receiving, from the access node, information identifying the first beam and information identifying the second beam.

The computer readable medium may comprise instructions which, when executed by the apparatus, cause the apparatus to further perform: sending, to the access node, one or more channel state information measurements, wherein at least the information identifying the first beam is based on the one or more channel state information measurements.

Determining the first beam and the second beam may comprise: receiving, from the access node, information identifying the first beam; and determining the second beam based on one or more channel state information measurements.

Determining the first beam and the second beam may comprise: obtaining one or more channel state information measurements; and determining the first beam and the second beam based on the obtained one or more channel state information measurements.

The computer readable medium may comprise instructions which, when executed by the apparatus, cause the apparatus to further perform: receiving, from the access node, beam usage information, wherein determining the first beam and the second beam comprises determining the first beam based on the obtained one or more channel state information measurements and the beam usage information.

The computer readable medium may comprise instructions which, when executed by the apparatus, cause the apparatus to further perform sending, to the access node, information identifying the first beam and information identifying the second beam.

Determining the first beam and the second beam based on the obtained one or more channel state information measurements may comprise: determining a plurality of candidate second beams based on the obtained one or more channel state information measurements; sending, to the access node, a list comprising the determined plurality of candidate second beams; and receiving, from the access node, information identifying the second beam selected from the list comprising the determined plurality of candidate second beams.

Determining the first beam and the second beam may comprise utilizing a machine learning model to determine at least the first beam.

The computer readable medium may comprise instructions which, when executed by the apparatus, cause the apparatus to further perform: performing model re-training of the machine learning model in response to receiving the re-transmission of the at least one data packet using the second beam.

Determining the second beam may comprise: sending, to the access node, a list comprising a plurality of candidate second beams; and receiving, from the access node, information identifying second beam selected from the list comprising the plurality of candidate second beams.

According to an aspect, there is provided a computer readable medium comprising instructions which, when executed by an apparatus, cause the apparatus to perform at least the following: attempting transmission at least one data packet to a user equipment using a first beam; determining that the transmission of the at least one data packet to the user equipment using the first beam has failed; and sending, to a user equipment, a re-transmission of at least one data packet using a second beam in response to determining that the transmission of the at least one data packet to the user equipment using the first beam has failed.

The computer readable medium may comprise instructions which, when executed by the apparatus, cause the apparatus to further perform: determining the first beam; and sending, to the user equipment, information identifying the first beam.

The computer readable medium may comprise instructions which, when executed by the apparatus, cause the apparatus to further perform determining the second beam.

Determining the second beam may comprise: receiving, from the user equipment, a list comprising a plurality of candidate second beams; selecting the second beam from the list comprising the plurality of candidate second beams; and sending, to the user equipment, information identifying the selected second beam.

Sending the information identifying the first beam may comprise sending, to the user equipment, information identifying the first beam and information identifying the second beam.

The computer readable medium may comprise instructions which, when executed by the apparatus, cause the apparatus to further perform: receiving, from the user equipment, one or more channel state information measurements, wherein determining the first beam comprises determining at least the first beam based on the obtained one or more channel state information measurements.

Determining the second beam may comprise determining the second beam based on the one or more channel state information measurements.

Determining the first beam may comprise determining the first beam based on the one or more channel state information measurements and beam usage information.

Determining the first beam may comprise utilizing a machine learning model to determine at least the first beam.

The computer readable medium may comprise instructions which, when executed by the apparatus, cause the apparatus to further perform re-training of the machine learning model in response to sending the re-transmission of the at least one data packet using the second beam.

The computer readable medium may comprise instructions which, when executed by the apparatus, cause the apparatus to further perform receiving, from the user equipment, information identifying the first beam and information identifying the second beam.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 5 shows methods according to some examples;

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
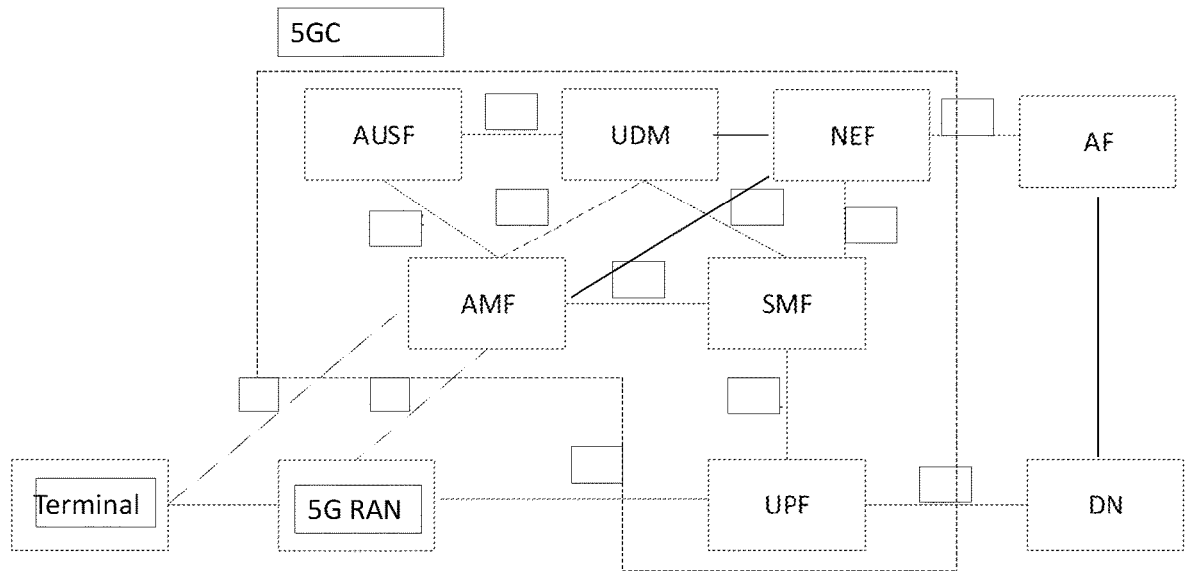
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
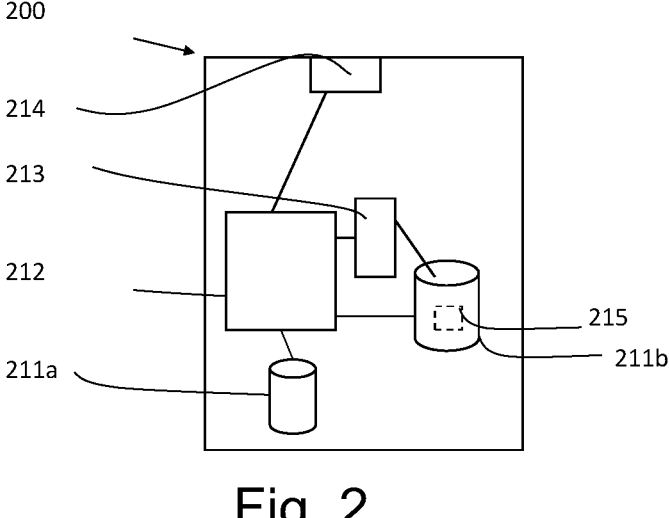
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RANI) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
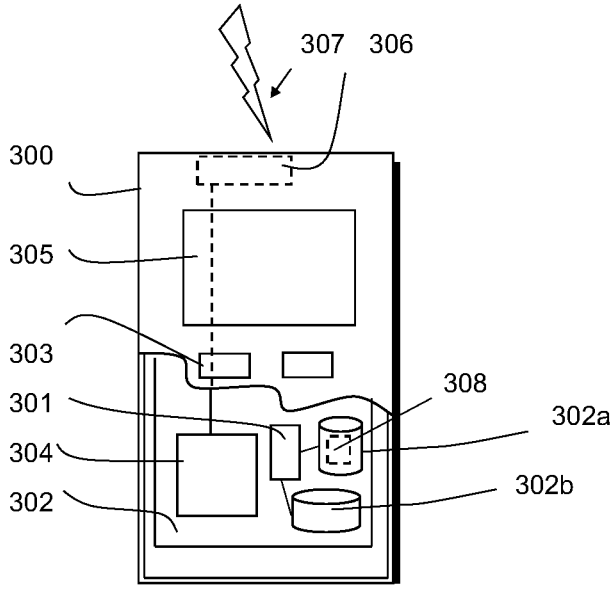
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Some networking architectures use machine learning (ML) to improve user QoS by selecting communication beams between an access point and a UE that may not be the strongest beam (signal strength wise).

ML may be used to assist gNB Tx/Rx beam selection for UEs with different QoS classes. In particular, ML may be used to learn which beam(s) could be a substitute for each reported (or measured) best gNB beam in order to increase e.g., throughput or latency, depending on the QoS requirements.

Figure 4:
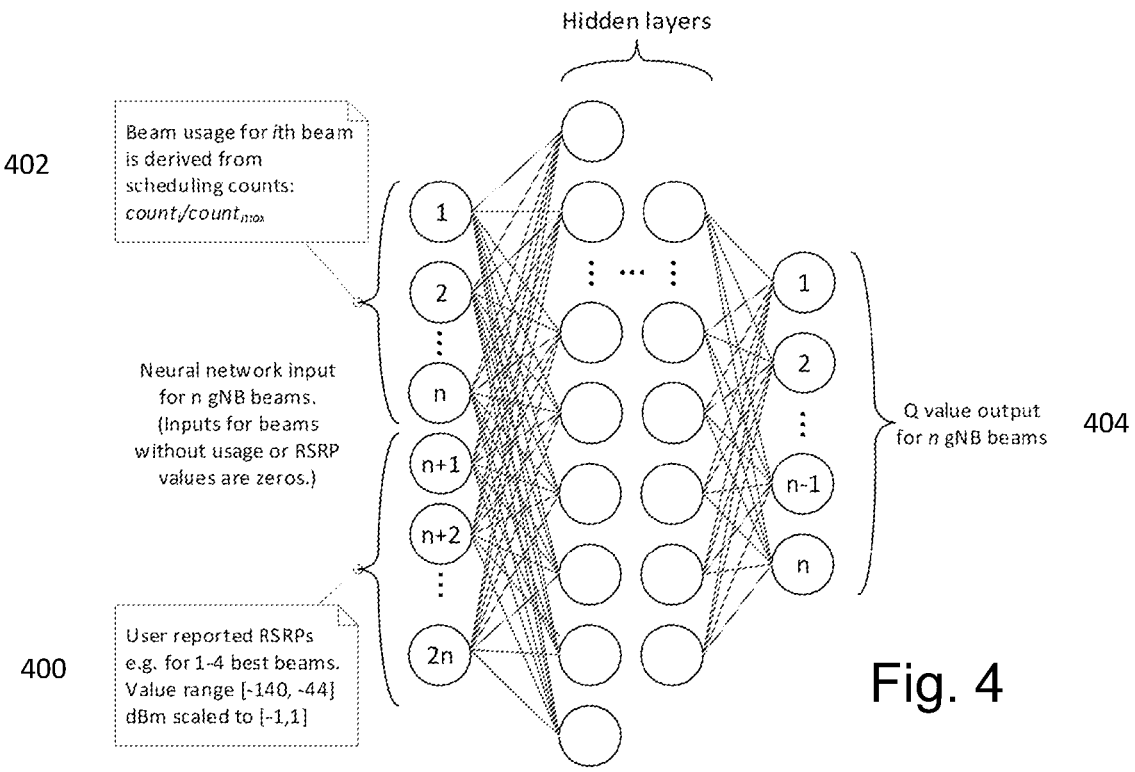
FIG. 4 shows a representation of an example neural network.

Machine learning is utilized because it may otherwise be challenging to develop an algorithm that would take into account multiple factors affecting performance, such as but not limited to:

probability of a UE being scheduled with certain beam due to QoS priorities of other UEs and their serving beams, typical interference fluctuation neighbour gNBs or other UEs cause to certain beam selection, combined performance of downlink and uplink with selected serving beam Example ML implementations include a neural network as shown in FIG. 4.

The neural network may be implemented with DQN (Deep Q-Network) taking as input information, such as signal strength information 400, about the N strongest beams and beam usage information 402, which can be for instance number of times certain beam has been scheduled.

The model may output Q-values 404 for each gNB beam, and a beam with the highest Q-value may be selected, unless explorative action is taken.

The model may explore according to a so called "epsilongreedy" principle, i.e., a random beam is selected with certain exploration probability. The reward (or the label) for the model may be defined as throughput or delay measured for the data-traffic with the selected beam.

This may allow the ML model to learn to select a beam that may not be always the strongest beam but the beam that is likely the best in terms of throughput or latency.

Thus, ML may help improve UE performance by selecting non-optimal (in signal strength wise) beams for some UEs. This may help fill frequency/time domain resources more efficiently. However, there may still be problems with this approach. For example:

1) A beam with a probably lower SINR may be more sensitive to occasional errors. Lower SINR may also be more sensitive to signal quality degradations due to blockage, fading dips, etc.

2) In addition, exploration (using beams that are weaker on average with randomized selection) might increases block error rate (BLER) and some packets may not be delivered successfully even with HARQ retransmissions According to some examples of the present disclosure, when UEs are scheduled for data packet transmission using a first beam (for example a ML-determined based best beam), an additional second beam (referred to herein as an "anchor beam") is configured for re-transmission of the data packet. In some examples the second beam may be configured to use with other higher priority transmissions.

The anchor-beam may act as a safety net for occasional errors or problems with the first beam, such as those caused by random exploration or otherwise uncertain beams during exploitation. This may improve network efficiency by reducing unnecessary re-transmissions at hopeless beams, as well as improve UE delay/throughput in case of occasional signal quality drops when in exploitation mode.

Reference is made to FIG. 5, which shows methods according to some examples.

At 500, a method comprises determining a first beam and a second beam for receiving at least one data packet from an access node of a network.

At 502, the method comprises receiving, from the access node, a re-transmission of the at least one data packet using the second beam when reception of the at least one data packet from the access node has failed using the first beam.

At 504, a method comprises attempting transmission at least one data packet to a user equipment using a first beam.

At 506, the method comprises determining that the transmission of the at least one data packet to the user equipment using the first beam has failed.

At 508, the method comprises sending, to a user equipment, a re-transmission of at least one data packet using a second beam in response to determining that the transmission of the at least one data packet to the user equipment using the first beam has failed.

Thus, in some examples, a UE may be scheduled with at least a first beam, which may for example, be selected by a ML model. In some examples, the first beam may be determined by a ML model at the UE and reported to the access node (for example a gNB), or may be determined by a ML at the access node and configured by the UE.

In addition to selecting the first beam, in some examples the ML model (either at the UE or at the access node) may select an anchor beam, and indicate/configure the anchor beam in a similar manner to the first beam.

In some examples, the anchor-beam may be a strongest beam. The strongest beam may be selected based on information that UE provides as part of the CSI, but in other examples the anchor beam may be any beam indicated by gNB or UE.

In some examples the anchor-beam may be used for re-transmissions. The UE may assume the gNB anchor-beam is for re-transmissions (DL or UL) and so the UE may configure its reception (Rx) and/or transmission (Tx) beams autonomously without additional signalling.

Thus, during an exploitation phase, the ML-agent can exploit more risky beams with the help of the anchor-beam, for instance, when the strongest beam is configured as the anchor. Since the ML-beam, due to lower SINR, may be more sensitive to fading and blockages, the occasional signal quality drops can be compensated with the preconfigured re-transmissions using the anchor-beam.

Furthermore, during an exploration phase, ML-agent may explore beams which have too low SINR to successfully transmit a data packet even with HARQ re-transmission. The anchor beam may allow successful retransmission of the data packet in such situations, and also may reduce the load of the gNB due to obsolete re-transmissions at the exploration-beam.

According to some examples, when UE and access node (e.g. gNB) is indicated/configured with the anchor-beam, UE and gNB may assume that at least the re-transmissions of a data packet are mapped to the anchor-beam. The anchor beam may be selected based on beam quality measurements (e.g. RSRP, RSRQ, and/or SINR) or ML-based beam selections.

Figure 6:
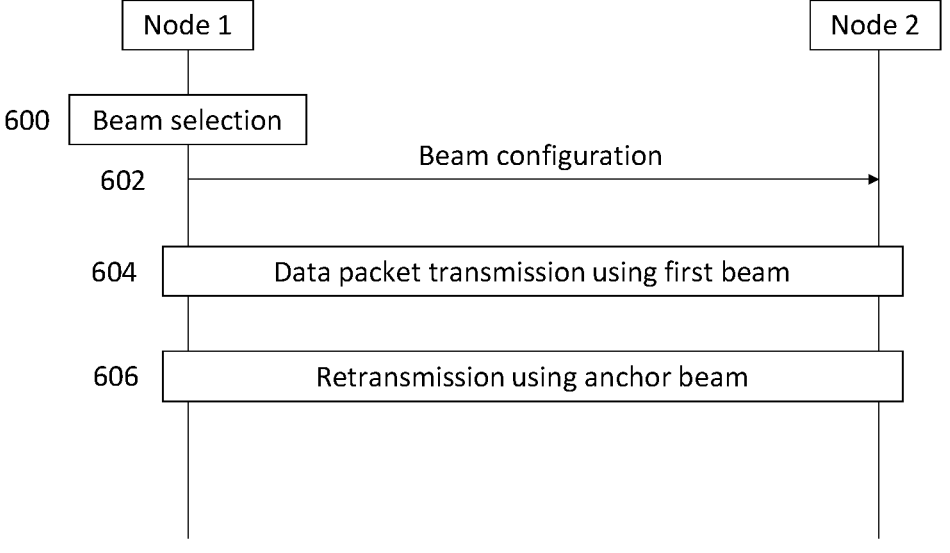
FIG. 6 shows a signalling exchange according to some examples.

Reference is made to FIG. 6, which shows a signaling exchange according to some examples. In the example of FIG. 6, a first node and second node are in communication, and the first node utilizes a ML model to predict the beam to be used for transmitting a data packet. The anchor beam may be selected based on separate ML model or it may rely on measurement-based beam selection methods currently specified for 3GPP 5G-NR.

At 600, the first node selects at least a first beam for communicating with the second node. For example, the first node may perform ML-based beam selection as discussed previously. The first node may be a gNB or UE with ML model predicting the beam to be used. The first node may also select an anchor beam.

At 602, the first node configures or otherwise indicates the selected first beam and optionally the anchor beam.

In some examples, the first node and second node (e.g. UE and gNB) agree to assume that the anchor-beam is always the previously reported strongest beam, for example based on measurement quantities such as RSRP, RSRQ, or SINR. The agreement may be indicated in RRC configuration signalling. Both the first node and second node may then automatically assume re-transmissions at anchor-beam until otherwise indicated.

In some examples, the first node may send an indication of the anchor beam to the second node. The indication may be a 1-bit feedback to use a previously reported strongest beam, or N-bit feedback to indicate kth strongest beam from the previously reported beams (e.g., 2 bits for 4th strongest beam CSI report), or arbitrary beam indicated with beam ID.

In some examples when the anchor beam is selected by the UE, the indication may be sent via CSI feedback or measurement report together with the ML-selected beam. The anchor-beam may be assumed to be set until next CSI reporting interval.

In some examples when anchor beam is configured by the gNB in addition to ML selected beams, the anchor beam can be indicated dynamically e.g., via MAC-CE or DCI together with the ML-selected beam.

At 604, at least one data packet is transmitted between the first node and the second node using the ML-selected best beam. For example, the gNB may send the at least one data packet to the UE, or the UE may send the at least one data packet to the gNB.

At 606, re-transmission of the at least one data packet is performed using the anchor beam when the transmission attempt at 604 fails.

In some examples, the UE may assume that retransmissions are transmitted/received with the anchor beam at the gNB. Hence, the UE may switch its panel or its own beams accordingly to have the strongest beam pairing possible for retransmissions.

In some examples, a gNB scheduler may prioritize retransmissions over new transmissions and the used beam may be selected based on highest priority traffic. Hence, in some examples a ML selected beam may not have the same impact for retransmissions than for the new transmissions. Therefore, the anchor beam usage for the retransmissions may improve the network overall performance.

Figure 7:
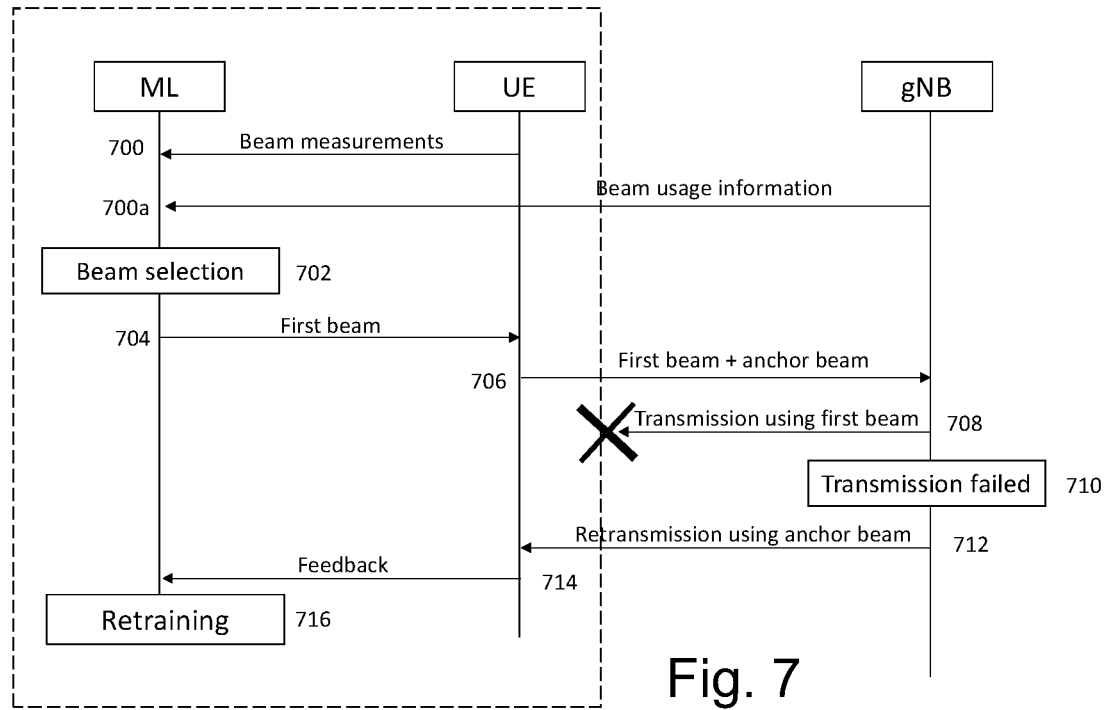
FIG. 7 shows a signalling exchange for a UE-side ML implementation according to some examples.

Reference is made to FIG. 7, which shows a UE-side ML implementation according to some examples. That is to say, in the example of FIG. 7, the ML model for determining at least the first beam is implemented in the UE. While the ML model is shown as a separate entity to the UE in FIG. 7, it should be understood that this is for illustrative purposes only, and that the functions described below with reference to the UE and ML model may be implemented in or by the same device.

At 700, the UE obtains beam measurements, such as CSI measurements, and provides the beam measurements as inputs to the ML model.

Optionally, at 700a, the gNB provides beam usage information to the UE, which in turn provides the beam usage information as a further input to the ML model.

At 702, the ML model determines at least a first beam for communications between the UE and the gNB based on the beam measurements and optionally the beam usage information.

At 704, the ML model provides an output indicating at least the first beam determined at step 702.

At 706, the UE sends an indication of the first beam to the gNB. For example, the UE may send CSI feedback comprising an indication of the first beam.

In some examples, the UE may determine the anchor beam (for example by selecting a beam with the highest beam quality or signal strength based on the beam measurements) and provide an indication of the anchor beam when sending the indication at 706.

At 708, the gNB may attempt to perform transmission of at least one data packet to the UE using the first beam indicated by the UE in step 706.

At 710, the gNB may determine that the transmission attempt at 708 was unsuccessful using the first beam.

In response, at 712, the gNB may perform retransmission of the data packet to the UE using the anchor beam.

At 714, in response to receiving the retransmission of the data packet via the anchor beam, the UE provides feedback to the ML model, and may optionally perform ML model re-training 716 for subsequent beam selection operations.

Figure 8:
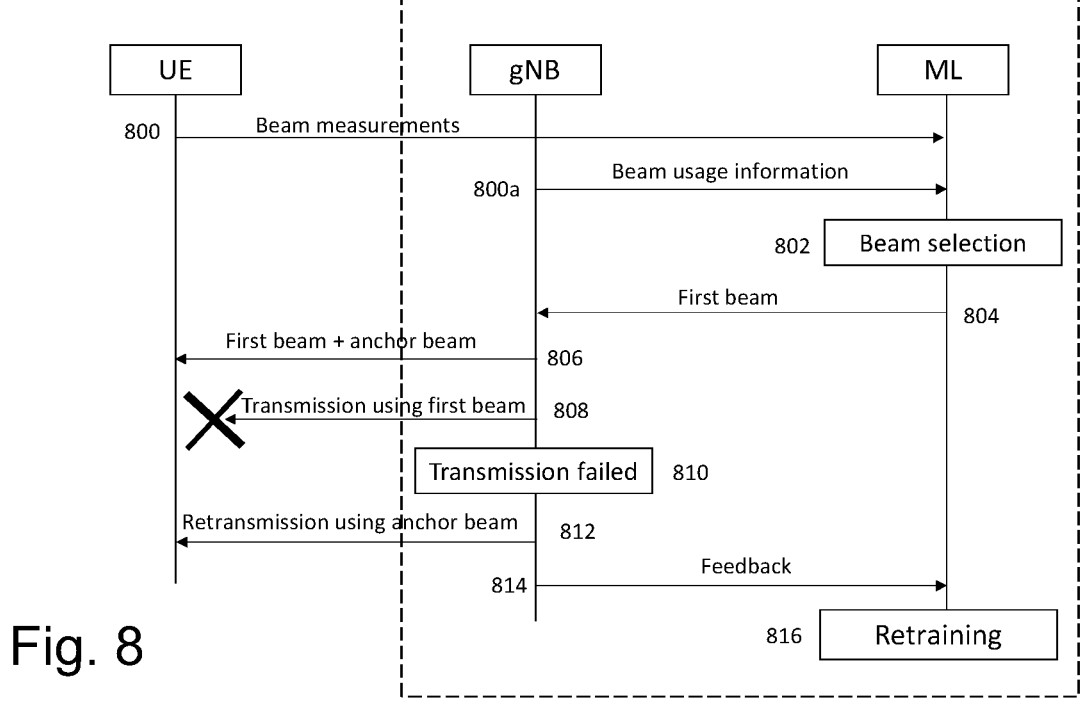
FIG. 8 shows a signalling exchange for a gNB-side ML implementation according to some examples.

Reference is made to FIG. 8, which shows a gNB-side ML implementation according to some examples. That is to say, in the example of FIG. 8, the ML model for determining at least the first beam is implemented in the gNB. While the ML model is shown as a separate entity to the gNB in FIG. 8, it should be understood that this is for illustrative purposes only, and that the functions described below with reference to the UE and ML model may be implemented in or by the same device.

At 800, the UE obtains beam measurements, such as CSI measurements, and provides the beam measurements to the gNB, which in turn provides the CSI measurements as inputs to the ML model.

Optionally, at 800a, the gNB provides beam usage information as a further input to the ML model.

At 802, the ML model determines at least a first beam for communications between the UE and the gNB based on the beam measurements and optionally the beam usage information.

At 804, the ML model provides an output indicating at least the first beam determined at step 802.

At 806, the gNB sends an indication of the first beam and the anchor beam to the UE.

In some examples, the gNB may determine the anchor beam by selecting a beam with the highest beam quality or signal strength based on the beam measurements and provide an indication of the anchor beam when sending the indication at 806.

At 808, the gNB may attempt to perform transmission of at least one data packet to the UE using the first beam indicated by the UE in step 806.

At 810, the gNB may determine that the transmission attempt at 808 was unsuccessful using the first beam.

In response, at 812, the gNB may perform retransmission of the data packet to the UE using the anchor beam.

At 814, in response to performing the retransmission of the data packet via the anchor beam, the gNB provides feedback to the ML model, and may optionally perform ML model re-training 816 for subsequent beam selection operations.

The anchor beam may be selected based on several different criteria or options, such as but not limited to:

Anchor beam may be configured to be the strongest beam reported by the UE. This may provide some benefits during beam exploration, as the anchor beam may be more likely to get a retransmission through to the UE;

Anchor beam may be indicated to be the strongest beam dynamically when ML model reports an explorative action. In some examples, an explorative action may be selected based on probability, and when such action is selected the anchor beam is also configured; or The node implementing the ML model may monitor the evolution of KPI(s) used to determine what the ML model has learned. In some examples, before the exploitation action is above set threshold, all actions (exploration and exploitation) may be configured with the anchor beam. After that, explorative actions may be configured with anchor beam which can be either the strongest beam, or the exploitation beam.

In some examples, separate beams for new data transmissions and retransmissions may be indicated, wherein at least the beams used for new data transmission are selected with ML model.

With the unified TCI state framework of NR, in some implementations the UE may receive two unified TCI states—2 joint TCI states, or 2 DL and/or 2 UL TCI states. One unified TCI state may correspond to the ML-based prediction beam (i.e. the first beam), and other unified TCI state may correspond to the anchor beam.

The first beam may be selected using an ML-based prediction, which may be based on actual measurements as well as other input parameters. The anchor beam may be selected differently, for example based on actual measurements without applying the ML-based prediction.

An indication of the two unified TCI states may be sent to the UE via downlink control information (DCI) or medium access control (MAC) control element (CE). There may be pre-defined association the allows derivation of the ML-based beam from the anchor beam.

In some examples, the UE may autonomously switch to another gNB beam if PDSCH or PUSCH transmission fails in order to receive or transmit a retransmission.

With the unified TCI state framework of NR, as in some implementations the PDCCH/PDSCH (and also UL channels in the case of joint TCI) may use a common beam for reception (and also for transmission in the case of joint TCI), the failure for PDSCH reception using the first beam may in some examples trigger beam switching to at least PDCCH and PDSCH reception from the anchor beam (e.g. other unified TCI state).

Additionally, in some examples the UE may assume a beam switch time for switching unified TCI state from the first beam to the anchor beam. The beam switch time may be defined with respect to the time difference between HARQ feedback instance and reception of PDCCH using the anchor beam. This beam switch time may be known to the gNB.

In some examples, after switching to another gNB beam, the UE may select a UE Tx/Rx panel and/or a UE Tx/Rx beam. The selection may be based on whether the transmitted or received PDSCH/PUSCH includes re-transmission.

The selection of panels may be included in the beam switching delay. The UE may indicate its capability for performing panel selection in UE capability information reported by the UE.

In some examples, the gNB may select Tx/Rx beam based on whether the transmitted or received PDSCH/PUSCH transmission includes re-transmission.

Based on received NACK, gNB may follow the other unified TCI state when scheduling the UE after meeting the beam switching time (if applicable).

In some examples, for DL when HARQ codebooks are used, if the NACK is received for some PDSCH receptions but not for all HARQ process IDs, there may be criteria defined whether the UE is allowed switch the beam or not. For example, beam may be switched only if more than X % (X may be defined/configured to the UE) HARQ feedback is in error.

In some examples, the UE may report gNB beam(s) suggested by the ML model implemented at the UE. In addition, the UE may report other beam(s) to be used for re-transmissions. CSI reporting may be enhanced to indicate the predicted beam vs anchored beam.

In some examples, the gNB may indicate the first beam to the UE, where the first beam may be selected by the ML model. In addition to indicating the first beam for new data transmissions, the gNB may indicate to the UE the anchor beam that shall be used for retransmissions. Alternatively, the gNB and UE may assume (without additional reporting) that the best beam based on the latest UE provided beam measurement report (such as L3 measurement report or L1 CSI report) shall be used for retransmission.

Thus in some examples a first node may select a first beam and anchor beam for communication with a second node, and may inform the second node of the selection. When an attempted transmission using the first beam fails, the anchor beam may be used for retransmission. As such, the selection of the first beam may use beams that are considered sub-optimal in terms of metrics such as signal strength or reliability, in the knowledge that the anchor beam, which may be a beam with a higher signal strength or reliability, is available for retransmission. This may be particularly beneficial when applied to ML beam selection, where beam exploration may result in the selection of a first beam which is not able to support the required transmission, for example by virtue of a too low SINR.

In some examples, there is provided an apparatus comprising means for determining a first beam and a second beam for receiving at least one data packet from an access node of a network; and means for receiving, from the access node, a re-transmission of the at least one data packet using the second beam when reception of the at least one data packet from the access node has failed using the first beam In some examples, the apparatus may comprise at least one processor and at least one memory storing instructions that, when executed by the at least one processor, cause the apparatus at least to: determine a first beam and a second beam for receiving at least one data packet from an access node of a network; and receive, from the access node, a re-transmission of the at least one data packet using the second beam when reception of the at least one data packet from the access node has failed using the first beam.

In some examples, there is provided an apparatus comprising means for attempting transmission at least one data packet to a user equipment using a first beam; means for determining that the transmission of the at least one data packet to the user equipment using the first beam has failed; and means for sending, to a user equipment, a re-transmission of at least one data packet using a second beam in response to determining that the transmission of the at least one data packet to the user equipment using the first beam has failed.

In some examples, the apparatus may comprise at least one processor and at least one memory storing instructions that, when executed by the at least one processor, cause the apparatus at least to: attempt transmission at least one data packet to a user equipment using a first beam; determine that the transmission of the at least one data packet to the user equipment using the first beam has failed; and send, to a user equipment, a re-transmission of at least one data packet using a second beam in response to determining that the transmission of the at least one data packet to the user equipment using the first beam has failed.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic, or any combination thereof. Some aspects of the disclosure may be implemented in hardware, while other aspects may be implemented in firmware or software which may be executed by a controller, microprocessor, or other computing device, although the disclosure is not limited thereto. While various aspects of the disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks, and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor-based memory devices, magnetic memory devices and systems, optical memory devices and systems, fixed memory, and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising:

at least one processor; and at least one memory storing instructions that, when executed by the at least one processor, causes the apparatus to perform:

receiving, from the access node, beam usage information, wherein the beam usage information comprises a number of times a beam has been scheduled;

determining a first beam and a second beam for receiving at least one data packet from an access node of a network, wherein determining the first beam and the second beam comprises:

obtaining one or more channel state information measurements, wherein the one or more channel state information measurements include signal strength information about N strongest beams, Reference Signal Received Power (RSRP) Reference Signal Received Quality (RSRQ), and Signal-to-Interference-plus-Noise Ratio (SINR); and determining the first beam and the second beam based on the obtained one or more channel state information measurements and the beam usage information by:

determining a plurality of candidate second beams based on the obtained one or more channel state information measurements;

sending, to the access node, a list comprising the determined plurality of candidate second beams; and receiving, from the access node, information identifying the second beam selected from the list comprising the determined plurality of candidate second beams, wherein a machine learning model is utilized to determine at least the first beam, the machine learning model comprising a deep Q-network configured to output Q-values for each beam, and configured to select the first beam based on a highest Q-value subject to epsilon-greedy exploration in which a random beam is selected with an exploration probability, wherein the second beam comprises an anchor beam configured as a safety net beam for retransmissions, wherein the anchor beam is selected as a strongest beam based on RSRP, RSRQ, or SINR indicated in the one or more channel state information measurements;

sending, to the access node, information identifying the first beam and information identifying the second beam;

receiving, from the access node, a re-transmission of the at least one data packet using the second beam when reception of the at least one data packet from the access node has failed using the first beam; and perform model re-training of the machine learning model in response to receiving the re-transmission of the at least one data packet using the second beam, wherein re-training of the machine learning model includes providing feedback to the machine learning model based on the retransmission received via the anchor beam.

* * * * *